United States Patent
Smith

(10) Patent No.: US 6,818,125 B2
(45) Date of Patent: Nov. 16, 2004

(54) ENGINE BLOCK WITH ANGLED OIL OUTLETS

(75) Inventor: Gerald F. Smith, Watertown, MN (US)

(73) Assignee: Vortex International, LLC, Peoria, IL (US)

(*) Notice: Subject to any disclaimer, the term of this patent is extended or adjusted under 35 U.S.C. 154(b) by 144 days.

(21) Appl. No.: 10/306,068

(22) Filed: Nov. 27, 2002

(65) Prior Publication Data

US 2003/0132151 A1 Jul. 17, 2003

Related U.S. Application Data

(63) Continuation-in-part of application No. 09/563,071, filed on Apr. 24, 2000, now abandoned.

(51) Int. Cl.[7] .............................................. B01D 21/26
(52) U.S. Cl. .................. 210/168; 210/304; 210/497.01; 210/499; 210/512.1; 123/195 R; 123/196 A
(58) Field of Search ................................. 210/168, 304, 210/497.01, 499, 512.1; 123/195 R, 196 A

(56) References Cited

U.S. PATENT DOCUMENTS

| | | |
|---|---|---|
| 601,392 A | 3/1898 | Bowden |
| 1,149,926 A | 8/1915 | Linke |
| 1,822,006 A | 9/1931 | Bull |
| 1,892,190 A | 12/1932 | Russel |
| 1,908,925 A | 5/1933 | Semon et al. |
| 1,976,914 A | 10/1934 | Benjamin |
| 2,083,005 A | 6/1937 | Czarnecki |
| 2,284,787 A | 6/1942 | Winkler |
| 2,382,276 A | 8/1945 | Wildmann |
| 2,390,841 A | 12/1945 | Longden |
| 2,423,329 A | 7/1947 | Le Clair |
| 2,743,018 A | 4/1956 | Belgarde |
| 2,879,892 A | 3/1959 | Frakes |

(List continued on next page.)

FOREIGN PATENT DOCUMENTS

| | | |
|---|---|---|
| DD | DD 288983 A5 | 4/1991 |
| DE | 3933794 A1 | 4/1991 |
| DE | 4022723 A1 | 4/1991 |
| EP | 0025628 A2 | 3/1981 |
| EP | 1118368 A2 | 7/2001 |
| FR | 2475118 | 8/1981 |
| GB | 1203514 | 8/1970 |
| GB | 1296051 | 11/1972 |
| GB | 2068765 A | 8/1981 |
| GB | 2258166 A | 2/1993 |
| SU | 1101273 A | 6/1982 |
| WO | WO 95/11072 | 4/1995 |
| WO | WO 97/01385 | 1/1997 |

OTHER PUBLICATIONS

NAPA Gold; Master Filter Catalog; Jan., 1999.

Primary Examiner—Matthew O. Savage
(74) Attorney, Agent, or Firm—Briggs & Morgan, P.A.

(57) ABSTRACT

An engine block on an engine with angled oil outlets adapted to engage a reusable fluid filter, consisting of: a pre-cast filter-connecting segment; the pre-cast filter-connecting segment having a filtered oil inlet in fluid communication with the engine and also including a number of angled oil outlets in fluid communication with the engine. The angled oil outlets are arranged circularly about a central axis of the pre-cast filter-connecting segment, and extend downwardly from the engine block at a first angle and outwardly at a tangent to a cylindrical reference surface parallel to the central axis.

11 Claims, 3 Drawing Sheets

U.S. PATENT DOCUMENTS

| | | |
|---|---|---|
| 2,933,192 A | 4/1960 | Gretzinger |
| 2,937,754 A | 5/1960 | Kasten |
| 2,983,384 A | 5/1961 | Winslow |
| 3,000,505 A | 9/1961 | Scavuzzo |
| 3,008,543 A | 11/1961 | Bourdale et al. |
| 3,036,711 A | 5/1962 | Wilhelm |
| 3,061,101 A | 10/1962 | Humbert |
| 3,095,283 A | 6/1963 | Wheeler, Jr. |
| 3,122,501 A | 2/1964 | Hultgren |
| 3,193,101 A | 7/1965 | Humbert, Jr. |
| 3,224,590 A | 12/1965 | Nord et al. |
| 3,225,929 A | 12/1965 | Sicard |
| 3,282,429 A | 11/1966 | Wood et al. |
| 3,283,902 A | 11/1966 | Farris et al. |
| 3,289,608 A | 12/1966 | Laval, Jr. |
| 3,289,847 A | 12/1966 | Rothemund |
| 3,348,695 A | 10/1967 | Rosaen |
| 3,400,821 A | 9/1968 | Singleton |
| 3,443,696 A | 5/1969 | Schutta |
| 3,473,666 A | 10/1969 | Humbert, Jr. |
| 3,490,597 A | 1/1970 | Caseleggi |
| 3,502,218 A | 3/1970 | Tuffnel et al. |
| 3,508,383 A | 4/1970 | Humbert et al. |
| 3,690,460 A | 9/1972 | Lindboe |
| 3,722,691 A | 3/1973 | Francois |
| 3,741,394 A | 6/1973 | Defenbaugh |
| 3,773,180 A | 11/1973 | Harrison |
| 3,785,491 A | 1/1974 | Dudinec et al. |
| 3,807,561 A | 4/1974 | Cullis |
| 3,882,025 A | 5/1975 | Talley, Jr. |
| 3,988,244 A | 10/1976 | Brooks |
| 4,045,349 A | 8/1977 | Humbert, Jr. |
| 4,108,778 A | 8/1978 | Lambert et al. |
| 4,132,641 A | 1/1979 | Elsworth |
| 4,349,438 A | 9/1982 | Sims |
| 4,465,595 A | 8/1984 | Cooper |
| 4,492,632 A | 1/1985 | Mattson |
| 4,622,136 A | 11/1986 | Karcey |
| 4,642,183 A | 2/1987 | Hebert |
| 4,690,759 A | 9/1987 | Mandy |
| 4,695,377 A | 9/1987 | Medley, III |
| 4,700,670 A | 10/1987 | Schade |
| 4,717,474 A | 1/1988 | Sims |
| 4,767,530 A | 8/1988 | Gilliam et al. |
| 4,783,271 A | 11/1988 | Silverwater |
| 4,992,166 A | 2/1991 | Lowsky et al. |
| 5,015,375 A | 5/1991 | Fleck |
| 5,047,148 A | 9/1991 | Arai |
| 5,051,173 A | 9/1991 | Hoelzl |
| 5,053,129 A | 10/1991 | Kitson |
| 5,066,180 A | 11/1991 | Lang et al. |
| 5,066,391 A | 11/1991 | Faria |
| 5,076,918 A | 12/1991 | Foust et al. |
| 5,078,877 A | 1/1992 | Cudaback et al. |
| 5,080,787 A | 1/1992 | Brown et al. |
| 5,082,561 A | 1/1992 | LaPierre |
| 5,084,162 A | 1/1992 | Conti |
| 5,089,129 A | 2/1992 | Brigman |
| 5,118,417 A | 6/1992 | Deibel |
| 5,152,890 A | 10/1992 | Linnersten |
| 5,171,430 A | 12/1992 | Beach et al. |
| 5,182,015 A | 1/1993 | Lee |
| 5,234,592 A | 8/1993 | Schneider |
| 5,284,579 A | 2/1994 | Covington |
| 5,291,969 A | 3/1994 | Diederich, Jr. |
| 5,342,511 A | 8/1994 | Brown et al. |
| 5,342,519 A | 8/1994 | Friedmann et al. |
| 5,376,268 A | 12/1994 | Ikeda |
| 5,387,340 A | 2/1995 | Ackerman |
| 5,432,519 A | 7/1995 | Sezal |
| 5,542,442 A | 8/1996 | Gorman, Sr. |
| 5,565,095 A | 10/1996 | Snowball |
| 5,569,373 A | 10/1996 | Smith et al. |
| 5,623,755 A | 4/1997 | Childress et al. |
| 5,674,393 A | 10/1997 | Terhune et al. |
| 5,753,117 A | 5/1998 | Jiang |
| 5,785,850 A | 7/1998 | Lynch et al. |
| 5,830,371 A | 11/1998 | Smith et al. |
| 5,922,199 A | 7/1999 | Hodgkins |
| 5,984,109 A | 11/1999 | Kanwar et al. |
| 6,068,762 A | 5/2000 | Stone et al. |
| 6,152,120 A | 11/2000 | Julazadeh |
| 6,355,169 B1 | 3/2002 | Smith |
| 6,409,919 B1 | 6/2002 | Tara |
| 6,488,848 B1 | 12/2002 | Smith |

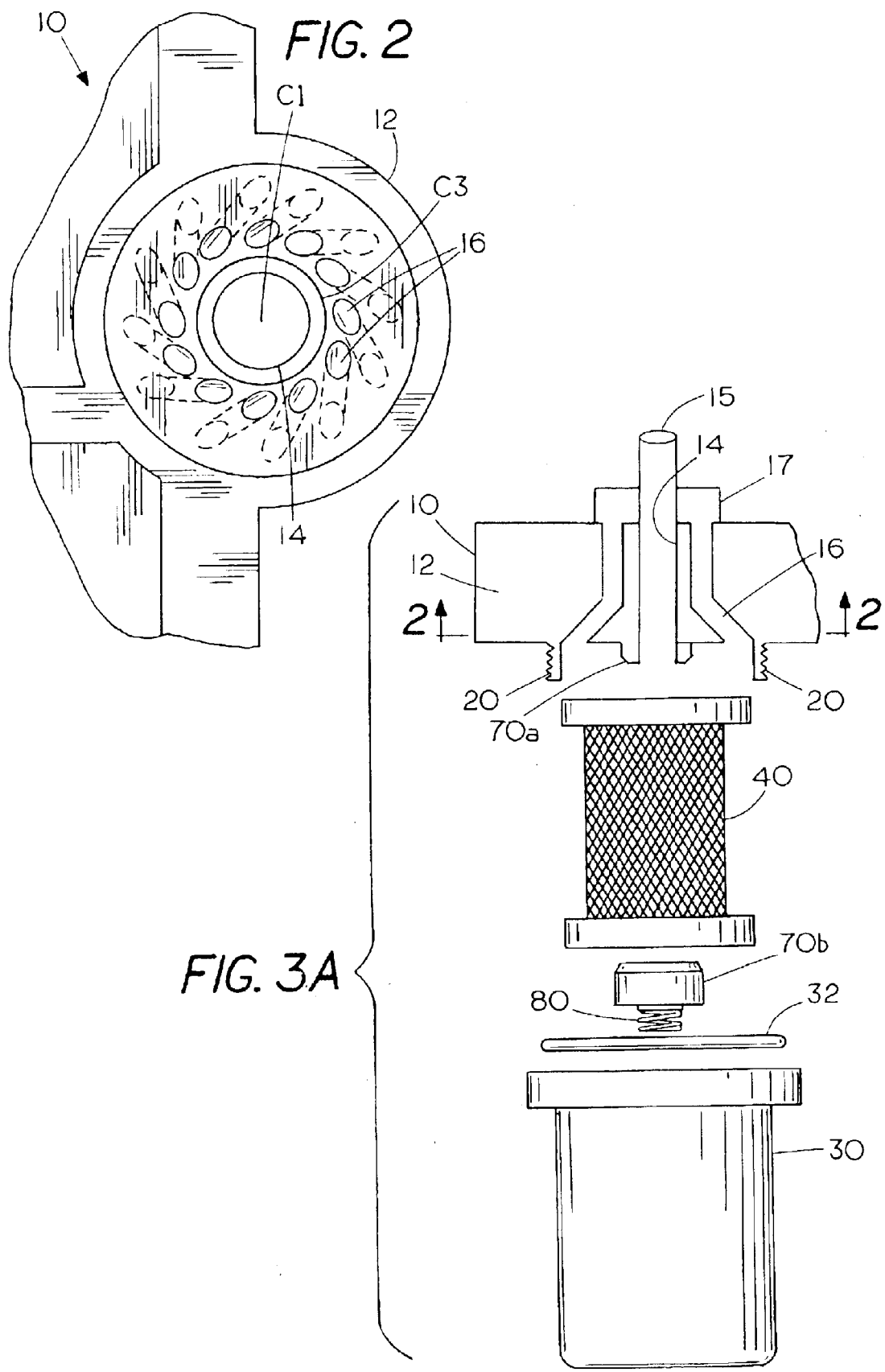

ENGINE BLOCK WITH ANGLED OIL OUTLETS

This application is a continuation-in-part of U.S. patent application Ser. No. 09/563,071, filed Apr. 24, 2000, now abandoned.

BACKGROUND OF THE INVENTION

This invention relates to filters for filtering fluids such as engine oil, coolant, fuel, hydraulic or transmission fluid. Fluid filters are used to remove contaminants from fluid.

Fluid filters are used to remove contaminants from fluid such as an engine oil. Internal combustion engines use oil to lubricate bearings and reduce friction. This oil is circulated through the engine and carries contaminants such as metal particles, carbon particles and dirt that may cause harm to the engine. In order to effectively lubricate the engine, engine oil is passed through a filter to remove the contaminants before the oil is recirculated into the engine. The typical oil filter is attached to an internal combustion engine at the oil filter receptacle. Engine oil passes through a discharge opening in the oil filter receptacle, into a fluid filter and then into the engine lubrication system through an oil inlet pipe. A filter element in the fluid filter removes contaminates from the oil before it reenters the engine through the oil inlet pipe. Because of the dynamic nature of this process, oil filters must be sealed to protect from oil leaking into the atmosphere.

Oil filters have traditionally been of a disposable type creating a great environmental concern. Used oil filters are disposed of in landfills or by incinerating. Recent improvements in the art have separated the filter elements from the filter canister allowing users to dispose of only the filter element and thus reducing the quantity of waste material. However, a large volume of waste is still generated by disposing of the filter element.

Various engine manufacturers, such as Caterpillar Detroit, etc., use different arrangements for attaching oil filters to their engine blocks. The different mount necessitates additional cost to produce and distribute oil filters. The supply of filters for various engine manufacturers involves the remanufacture of major components of an oil filter or an entire filter assembly in order to adapt a filter product to a particular engine.

There is a need for a fluid filter for filtering a variety of fluids which features a reusable filter element and which can easily be adapted to different connection configurations, especially for use in engines as oil filters.

SUMMARY OF THE INVENTION

An engine block on an engine with angled oil outlets adapted to engage a reusable fluid filter for mounting, comprising:

a) a pre-cast filter-connecting segment;

b) said pre-cast filter-connecting segment having a filtered oil inlet in fluid communication with the engine;

c) said pre-cast filter-connecting segment having a plurality of angled oil outlets in fluid communication with the engine; and d) wherein said angled oil outlets are arranged circularly about a central axis of said pre-cast filter-connecting segment, said angled oil outlets extending downwardly from the engine block at a first angle and outwardly at a second angle to a cylindrical reference surface parallel to said central axis.

An object of the invention is to provide a simple, cost effective method of using cleanable filters.

A further advantage of the invention is a reusable filter element which will reduce landfill volume and the number of filter elements burned in incinerators and reduce the cost of filter maintenance.

A feature of the invention is an adapter body which has angled fluid inlet ports to create a turbine action within the canister to suspend contaminants, which are filtered from the fluid by the filter element in the swirling unfiltered fluid. A principle object and advantage of the present invention is that the fluid filter adapter body component is molded directly into the engine block.

Further features and advantages of the invention are pointed out with the description of the preferred embodiment, drawings and claims of this application.

BRIEF DESCRIPTION OF THE DRAWINGS

FIG 2 is a cross-section along the lines 2 of FIG. 3A of the engine block with angled oil outlets of the present invention;

FIG. 3a is an exploded view of the engine block with angled oil outlets of the present invention, including a filter canister and reusable filter element;

DETAILED DESCRIPTION OF PREFERRED EMBODIMENTS

Figure 1A:
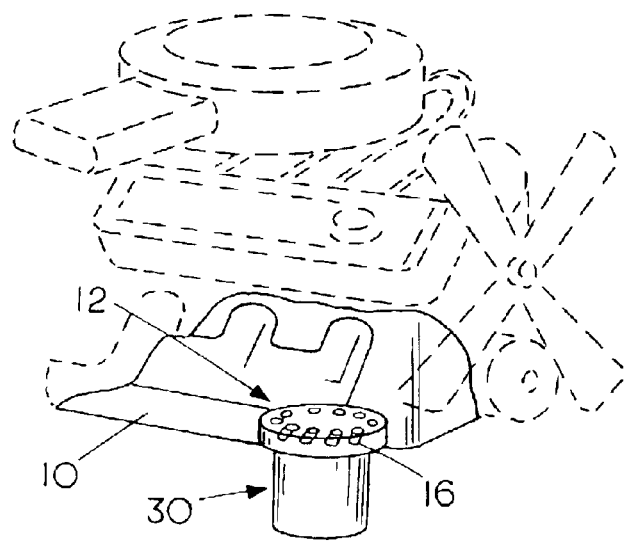
FIG. 1A is a perspective view of the engine block with angled oil outlets of the present invention.

Parts of the present invention have been previously disclosed in U.S. Pat. No. 5,830,371, hereby incorporated by reference.

The engine block with angled oil outlets of the present invention is generally shown in the Figures as reference numeral 10.

Engine block 10 comprises a pre-cast filter-connecting segment 12 adapted for mounting an oil filter thereon.

Pre-cast filter-connecting segment 12 comprises a filtered oil inlet 14 in fluid communication with the engine. Suitably, engine block 10 has filtered oil tube 15 which receives filtered oil from filtered oil inlet 14. The segment 12 has an outside face 12a and an inside face 12b.

Pre-cast filter-connecting segment 12 also comprises a plurality of angled oil outlets 16 in fluid communication from the engine. Suitably, engine block 10 has unfiltered oil source 17 from the oil pump. Unfiltered oil source 17 communicates with angled oil outlets 16.

It should be understood that unfiltered oil from the engine is sent through the angled oil outlets 16 to an oil filter, while filtered oil form the oil filter returns to the engine through filtered oil inlet 14.

Angled oil outlets 16 are formed at an angle to an axis of the pre-cast filter connecting segment 12 in order to create a turbine or swirling motion of unfiltered fluid in the canister 30.

Figure 3B:
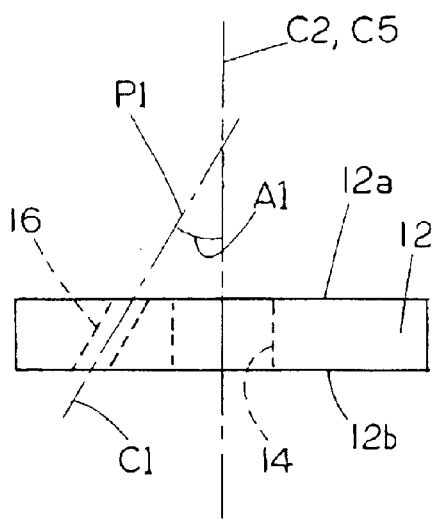
FIG. 3b is a detailed view of the engine block with angled oil outlets of the present invention.
Figure 4:
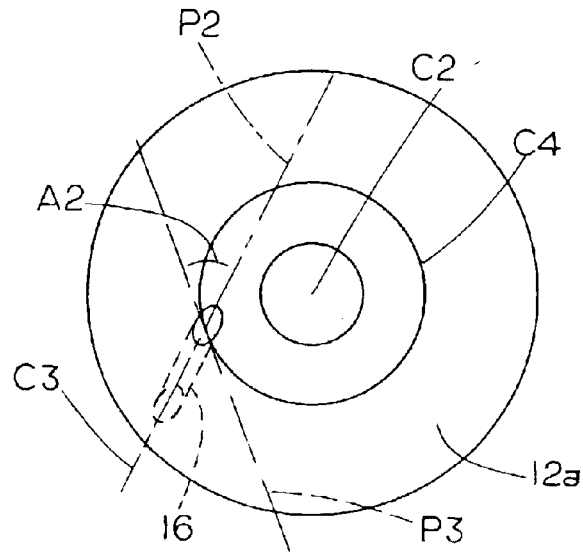
FIG. 4 shows a schematic top view of the filter-connection segment of the present invention.

In one embodiment, planes P1 coincident with the central axis C1 of each respective angled oil outlet intersect the central axis C2 of the pre-cast filter-connecting segment 12 at a point exteriorly of and adjacent to the outside face 12a of the pre-cast filter-connecting segment 12 to form a first acute interior angle A1 as shown in FIG. 3B. In addition, as shown in FIG. 4, planes P2 coincident with respective central axes C3 of said angled oil outlets 16 and parallel to the central axis C2 of said pre-cast filter-connecting segment 12 form a second acute interior angle A2 with respective planes P3 that are tangent to a cylindrical reference surface C4 coaxially surrounding the central axis C2 of the pre-cast filter-connecting segment 12 and intersecting the central axis C3 of the respective angled oil outlet 16 at said outside face 12a as shown in FIG. 4. The angled oil outlets 16 thus create a swirling fluid motion inside canister 30 which is circular around filter element 40 to suspend contaminant particles in the unfiltered fluid.

Figure 5:
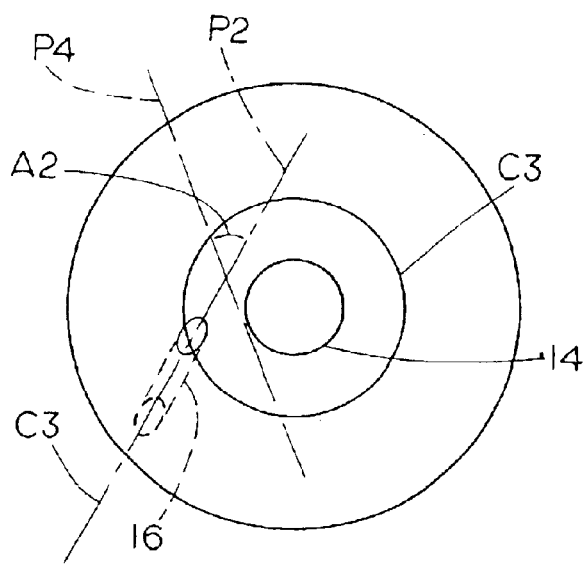
FIG. 5 is the same as FIG. 4, but showing a second embodiment.

In a second embodiment, planes P1 coincident with the central axis C1 of each respective angled oil outlet intersect the central axis C5 of the filtered oil inlet 14 at a point exteriorly of and adjacent to the outside face 12a of the pre-cast filter-connecting segment 12 to form a first acute interior angle A1 as shown in FIG. 3B. As shown in FIG. 5, planes P4 tangent to the filtered oil inlet 14 intersect planes P2 coincident with respective axes C3 of said angled oil outlets 16 to form the second acute interior angle A2.

Preferably, first acute angle $A_1$ and second acute angle $A_2$ are about sixty degrees.

Figure 1B:
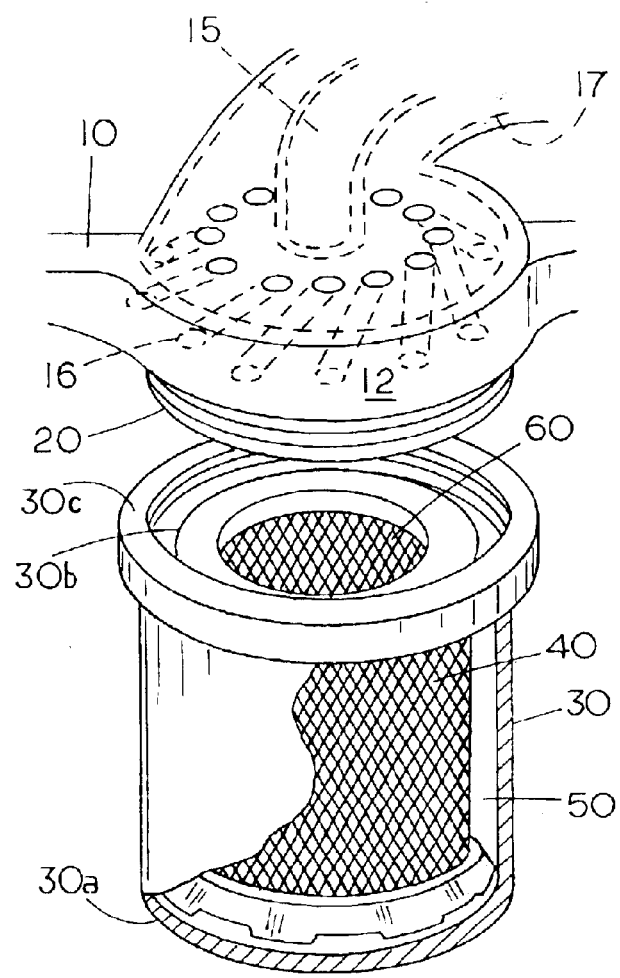
FIG. 1B is a detailed perspective view of the engine block with angled oil outlets of the present invention, showing a filter canister attachable to the engine block.

As shown in FIG. 1B, external canister threads 20 are formed in pre-cast filter-connecting segment 12 for threadably adapting to a canister 30.

An external oil filter canister 30 and reusable filter may be provided for mounting on the pre-cast filter-connecting segment 12. Canister 30 comprises a closed end 30a, and open end 30b, and internal threads 30c adapted to threadingly engage the external threads 20 of the pre-cast filter-connecting segment 12. See FIG. 1B. Adjacent external canister threads 20, a sealing means such as a canister o-ring 32 is mounted on pre-cast filter-connecting segment 12. Canister o-ring 32 is positioned to form an oil tight seal between pre-cast filter-connecting segment 12 and canister 30. See FIG. 3a.

A cylindrical, reusable oil filter element 40 comprises a woven mesh is mounted on the pre-cast filter-connecting segment 12 within the canister 30. The filter 40 extends into the canister 30 and defines an unfiltered fluid compartment 50 between the filter 40 and canister 30 and a filtered fluid compartment 60 separated from the unfiltered fluid compartment 50 by the filter 40.

The angled oil outlets 16 are in fluid communication with the unfiltered fluid compartment 50 and the filtered oil inlet 14 is in fluid communication with the filtered fluid compartment 60. See FIG. 1B.

The angled oil outlets 16 cause a swirling fluid motion in the unfiltered fluid compartment 50 around the filter 40, causing contaminants in the oil to remain suspended until they encounter the filter 40. The swirling fluid motion also causes contaminants larger than the mesh openings in the filter 40 to be forced to a contaminant trap (not shown) at the bottom of the canister 30.

The pre-cast filter-connecting segment 12 may further comprise a nipple 70a in fluid communication with the filtered fluid compartment 60 and extending into and engaging the cylindrical, reusable filter 40 to sealingly connect the filter 40 to the pre-cast filter-connecting segment 12. A similar nipple 70b may extend into and engage the filter 40 at its bottom end, and a spring 80 may bias the filter 40 away from the bottom of the canister 30, thus keeping the filter tightly engaged with the nipple 70b.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An engine block on an engine with angled oil outlets adapted to engage a reusable fluid filter comprising:
   a) a pre-cast filter-connecting segment molded directly into the engine block;
   b) said pre-cast filter-connecting segment having a filtered oil inlet in fluid communication with the engine; and
   c) said pre-cast filter-connecting segment having a plurality of angled oil outlets in fluid communication with the engine, said angled oil outlets causing a swirling motion about the reusable fluid filter.

2. The engine block of claim 1, wherein said pre-cast filter connecting segment further comprises an inside face and an outside face, said angled oil outlets traversing said pre-cast filter-connecting segment from said inside face to said outside face, and wherein said angled oil outlets each has a central axis, wherein a plane coincident with the central axis of said angled oil outlet intersects the central axis of said pre-cast filter-connecting segment at a point exteriorly of and adjacent to the outside face of said pre-cast filter-connecting segment to form a first acute interior angle therewith, and wherein a plane coincident with the central axis of said angled oil outlet and parallel to the central axis of said pre-cast filter-connecting segment forms a second acute interior angle with a plane that is tangent to a cylindrical reference surface coaxially surrounding the central axis of said pre-cast filter-connecting segment and intersecting the central axis of said angled oil outlet at said outside face.

3. The engine block of claim 2, wherein said first acute interior angle is about sixty degrees and wherein said second acute interior angle is about sixty degrees. about sixty degrees.

4. The engine block of claim 1, further comprising external threads on said pre-cast filter-connecting segment adapted for mounting a filter canister.

5. The engine block of claim 4, further comprising:
   a) a cylindrical canister having a closed end and an open end, and internal threads adapted to threadingly engage the external threads of said pre-cast filter-connecting segment, and means for sealing the canister to said pre-cast filter-connecting segment;
   b) a cylindrical, reusable filter comprising a woven mesh, the filter adapted to be mounted on said pre-cast filter-connecting segment, the filter extending into the canister and defining an unfiltered fluid compartment and a filtered fluid compartment, the unfiltered fluid compartment being between the filter and the canister, the filtered fluid compartment being separated from the unfiltered fluid compartment by the filter;
   c) said angled oil outlets being in fluid communication with the unfiltered fluid compartment and said filtered oil inlet being in fluid communication with the filtered fluid compartment; and
   d) whereby said angled oil outlets cause a swirling fluid motion in the unfiltered fluid compartment around the filter.

6. The engine block of claim 5, further comprising a nipple on said pre-cast filter-connecting segment in fluid communication with the filtered fluid compartment and extending into and engaging the cylindrical, reusable filter to connect the filter to said pre-cast filter-connecting segment.

7. An engine block on an engine with angled oil outlets adapted to engage a reusable fluid filter comprising:
 a) a pre-cast filter-connecting segment molded directly into the engine block;
 b) said pre-cast filter-connecting segment having a filtered oil inlet in fluid communication with the engine;
 c) said pre-cast filter-connecting segment having a plurality of angled oil outlets in fluid communication with the engine; and
 d) wherein said pre-cast filter connecting segment further comprises a central axis, an inside face, and an outside face, said angled oil outlets traversing said pre-cast filter-connecting segment from said inside face to said outside face, and wherein said angled oil outlets each has a central axis, wherein a plane coincident with the central axis of said angled oil outlet intersects the central axis of said pre-cast filter-connecting segment at a point exteriorly of and adjacent to the outside face of said pre-cast filter-connecting segment to form a first acute interior angle therewith, and wherein a plane coincident with the central axis of said angled oil outlet and parallel to the central axis of said pre-cast filter-connecting segment forms a second acute interior angle with a plane that is tangent to a cylindrical reference surface coaxially surrounding the central axis of said pre-cast filter-connecting segment and intersecting the central axis of said angled oil outlet at said outside face.

8. The engine block of claim 7, wherein said first acute interior angle is about sixty degrees and wherein said second acute interior angle is about sixty degrees.

9. The engine block of claim 7, further comprising external threads on said pre-cast filter-connecting segment adapted for mounting a filter canister.

10. The engine block of claim 9, further comprising:
 a) a cylindrical canister having a closed end and an open end, and internal threads adapted to threadingly engage the external threads of said pre-cast filter-connecting segment, and means for sealing the canister to said pre-cast filter-connecting segment;
 b) a cylindrical, reusable filter comprising a woven mesh, the filter adapted to be mounted on said pre-cast filter-connecting segment, the filter extending into the canister and defining an unfiltered fluid compartment and a filtered fluid compartment, the unfiltered fluid compartment being between the filter and the canister, the filtered fluid compartment being separated from the unfiltered fluid compartment by the filter;
 c) said angled oil outlets being in fluid communication with the unfiltered fluid compartment and said filtered oil inlet being in fluid communication with the filtered fluid compartment; and
 d) whereby said angled oil outlets cause a swirling fluid motion in the unfiltered fluid compartment around the filter.

11. The engine block of claim 10, further comprising a nipple on said pre-cast filter-connecting segment in fluid communication with the filtered fluid compartment and extending into and engaging the cylindrical, reusable filter to connect the filter to said pre-cast filter-connecting segment.

* * * * *